United States Patent [19]

Ackerman et al.

[11] Patent Number: 5,356,306
[45] Date of Patent: Oct. 18, 1994

[54] METAL CONDUCTOR ELEMENT

[75] Inventors: Bryan Ackerman, Freeland, Mich.; Brian Prokuda, Knoxville, Tenn.

[73] Assignee: The Dow Chemical Company, Midland, Mich.

[21] Appl. No.: 173,857

[22] Filed: Dec. 23, 1993

Related U.S. Application Data

[63] Continuation of Ser. No. 976,588, Nov. 16, 1992, abandoned, which is a continuation-in-part of Ser. No. 696,894, May 7, 1991, Pat. No. 5,166,475.

[51] Int. Cl.⁵ .................................... H01R 40/26
[52] U.S. Cl. ........................ 439/387; 174/47; 285/55; 439/609; 439/920
[58] Field of Search ............ 439/32, 33, 100, 387, 439/436–439, 609, 920; 174/47, 78, 845; 285/55

[56] References Cited

U.S. PATENT DOCUMENTS

| | | |
|---|---|---|
| 874,085 | 12/1907 | Karns . |
| 2,480,858 | 9/1949 | Hobbs ............................ 439/920 |
| 2,583,189 | 4/1949 | Shewman . |
| 2,708,266 | 5/1955 | Pavlinetz ......................... 339/176 |
| 2,715,714 | 8/1955 | Pavlinetz ......................... 339/213 |
| 3,111,264 | 1/1962 | Groff ............................... 238/14.5 |
| 3,199,879 | 8/1965 | Fleming .......................... 285/55 X |
| 3,228,096 | 1/1966 | Albro ............................... 285/55 X |
| 3,284,108 | 11/1966 | West ................................ 285/55 |
| 4,127,287 | 11/1978 | Davies ............................. 285/55 |
| 4,346,428 | 8/1982 | Gale ................................ 174/47 X |
| 4,406,505 | 9/1983 | Auramovich .................... 439/387 |
| 4,447,076 | 5/1984 | Evans .............................. 285/55 |
| 4,537,425 | 8/1985 | Press et al. ..................... 285/55 |
| 4,635,162 | 1/1987 | McLaughlin ................. 174/845 X |
| 4,655,481 | 4/1987 | Prueter ........................ 285/55 X |
| 4,889,959 | 12/1989 | Taylor et al. ................... 439/609 |
| 5,015,802 | 5/1991 | Chi ................................. 439/609 |
| 5,233,507 | 8/1993 | Günther et al. ............... 439/609 X |

Primary Examiner—Steven C. Bishop

[57] ABSTRACT

This invention relates to a metal conductor element for improving electrical conductivity between spaced metal faces.

5 Claims, 2 Drawing Sheets

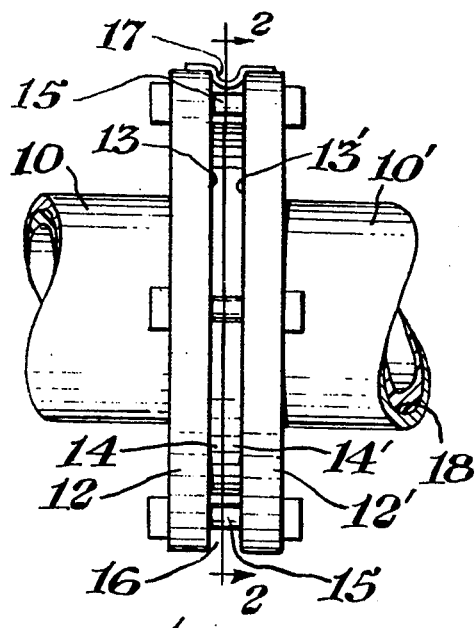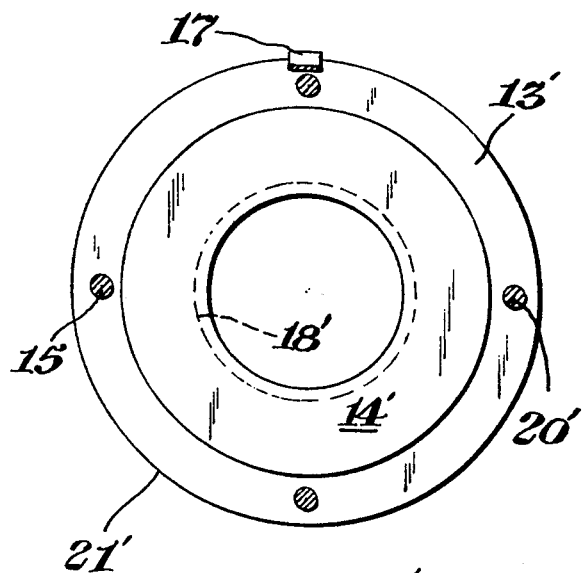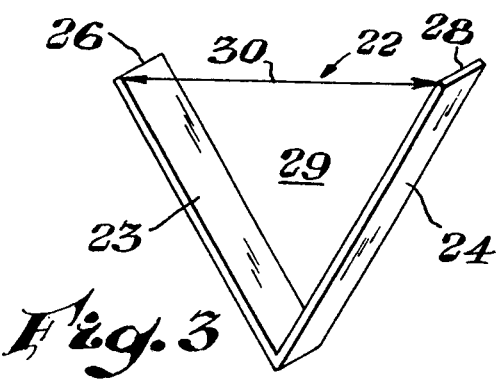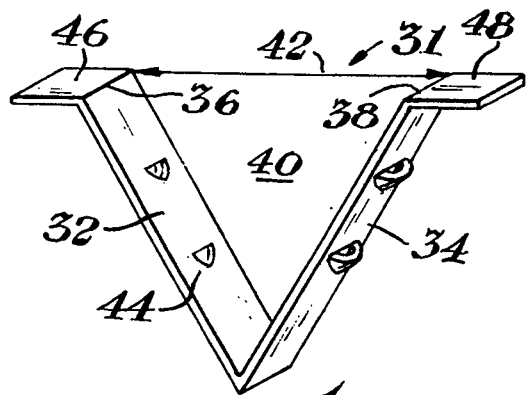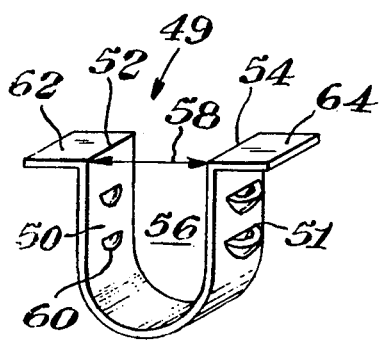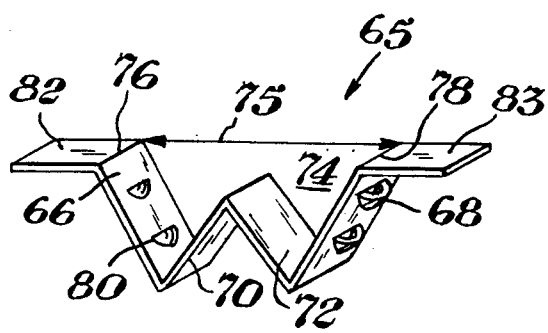

METAL CONDUCTOR ELEMENT

CROSS-REFERENCE TO RELATED APPLICATION

This is a continuation of application Ser. No. 07/976,588, filed Nov. 16, 1992, now abandoned, which application is a continuation-in-part of U.S. Ser. No. 07/696,894, which was filed on May 7, 1991, now U.S. Pat. No. 5,166,475.

FIELD OF THE INVENTION

This invention relates to a means for ensuring electrical conductivity between adjacent metal faces.

BACKGROUND OF THE INVENTION

Currently available and well known plastic lined piping products comprise a family of pipes, fittings, and valves especially designed for handling corrosive or high purity liquids. Such products generally comprise steel lined with a polymeric material, e.g., polyvinylidene chloride, polypropylene, polyvinylidene fluoride, and polytetrafluoroethylene. Such products enjoy both the structural integrity of steel and the high chemical resistance characteristic of the selected polymeric liner. The external surface of such products often bears a thin coating of paint to protect the steel from corrosive substances found in the operating environment.

Each pipe, fitting, and valve will contain a flange at or substantially near each end thereof. Adjacent pipes, fittings, and valves, within a given pipeline, may be joined one to the other by the fastening together of such flanges, e.g., by bolting. Such bolts may be coated with a polymer, e.g., polytetrafluoroethylene, to inhibit the corrosion thereof.

To secure the polymeric liner within a given pipe, fitting, or valve, such liner is provided with a length greater than that of the bore through which it extends. Upon the application of heat and pressure, the liner is flared over the pipe end, which in some cases will be the anterior flange face. In such cases, the flaring will preferably not cause an extension of the liner to the circumferential edge of the flange. Thus, when adjacent flanges are secured together, e.g., by bolting, a gap remains between adjacent opposing anterior flange faces equal to at least the thicknesses of the flared polymeric liners. The presence of this gap precludes the conductivity of electricity between adjacent components when non-conductive bolts, e.g. polytetrafluoroethylene coated bolts, are used.

Methods of establishing electrical conductivity between adjacent components are known in the art. For instance, external lock tooth washers may be compressed between the bolt head and posterior flange face of a first component, and between the nut and flange of the adjacent component. Such washers bear teeth which serve to remove the paint from the outer surface of the posterior flange faces and the non-conductive coating from the bolts, thereby providing points of conductivity. While providing improved conductivity along a given pipeline, external lock tooth washers present undesirable complications. First, the installation of such washers or the replacement of a corroded washer after the assembly of the pipeline is impossible without dismantling at least the effected portion of the pipeline. This often involves clearing the pipeline of chemical substances contained therein, removing the connecting bolts, installing the washer(s), and retorquing the bolts. Second, the presence of external lock tooth washers causes torquing problems. Such washers cause an increase in friction between the nut and the posterior flange face. This increased friction is added torque, causing an inaccurate torque reading by the torque wrench. Thus, such washers may lead to insufficiently tight bolts, which may in turn lead to leaks at the pipe joint.

It is further known to provide conductivity clamps on adjacent components which bite into the paint and provide points of conductivity. A conductive wire connects the clamps located on adjacent pipes, providing a conductive path therebetween. Such clamps tend to be relatively expensive.

Those in the industry would find great advantage in a means for providing electrical contact between the opposing anterior faces of adjacent metal pipe flanges which is both cost effective and practical. Such means should be easy replaceable and should not result in torquing problems. The loss or corrosion of such means should likewise be easily detectable. Such means should preferably permit the establishment of electrical conductivity between relatively widely spaced anterior flange faces, e.g., anterior flange faces spaced approximately one inch apart.

SUMMARY OF INVENTION

Accordingly, this invention provides a metal conductor element suitable for insertion between adjacent metal faces comprising a bent metal strip in part defined by first and second arm portions with corresponding first and second arm ends, the arms disposed such that the conductor is substantially U-shaped, V-shaped or W-shaped, the arm portions defining a corresponding U-shaped, V-shaped, or W-shaped gap therebetween, the first and second arm portions bearing barbs.

Such a conductor may be barbed at its exterior contacting surface(s) to facilitate retention of the conductor between the opposing metal faces. Such barbs may further serve to remove a portion of a nonconductive coating present on the metal faces as the conductor is inserted, to establish the points of electrical contact. Conductors may be provided with means for pressing the conductor into contact with the opposing metal faces, providing electrical continuity therebetween. Such means may comprise a piece of compressible material adapted for receipt within the U-shaped, V-shaped, or W-shaped gap. Likewise, the means may comprise a bent compressible metallic member suitable to urge the conductor into electrical contact with the opposing spaced metal faces. Preferred conductors will have tabs, such that the conductor may be inserted between the opposing metal faces exclusive of the tabs. Such tabs render the inserted conductor readily visible at the point between the adjacent metal faces and/or serve to control the depth of insertion of the conductor.

These and other embodiments are more fully discussed in the following detailed description.

BRIEF DESCRIPTION OF THE DRAWINGS

FIG. 1 is a fragmentary side elevational view of two sections of pipe with a flange connection of the subject invention illustrated therewith;

FIG. 2 is a cross sectional view of the pipe flange connection of FIG. 1 taken along line 2—2;

FIG. 3 is a greatly enlarged isometric view of a V-shaped conductor which forms a part of one embodiment of the subject invention;

FIG. 4 is a greatly enlarged isometric view of a V-shaped tabbed barbed conductor which forms a part of another embodiment of the subject invention;

FIG. 5 is a greatly enlarged isometric view of a U-shaped tabbed barbed conductor which forms a part of another embodiment of the subject invention;

FIG. 6 is a greatly enlarged isometric view of a W-shaped tabbed barbed conductor which forms a part of another embodiment of the subject invention.

DETAILED DESCRIPTION

Figure 7:
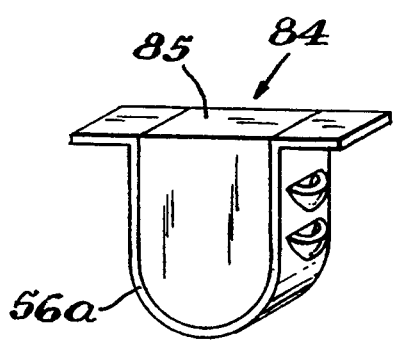
FIG. 7 is a greatly enlarged isometric view of a conductor similar to that of FIG. 5, provided with a piece of compressible material within the gap.

This invention provides a cost effective, practical means of ensuring electrical conductivity between adjacent components of an externally painted, polymerically lined pipeline. FIG. 1 is a fragmentary side elevational view of such a pipeline incorporating such conductivity means. Such a pipeline comprises two adjacent pipe segments 10 and 10', respectively. Pipe segments 10 and 10' end at flanges 12 and 12', respectively. Flanges 12 and 12' have anterior flange faces 13 and 13', respectively. Reference numerals 14 and 14' refer to the portion of the polymeric liners flared about anterior flange faces 13 and 13'. The presence of flared polymeric liners portions 14 and 14' precludes direct contact between adjacent anterior flange faces 13 and 13'. Bolts 15 serve to fasten together flanges 12 and 12'. Reference numeral 16 indicates the resulting flange gap between the anterior flange faces 13 and 13'. The metal conductor 17, inserted within flange gap 16 between and in contact with anterior flange faces 13 and 13', and fabricated of a material conductive toward electricity, provides a means of ensuring electrical conductivity between adjacent pipe sections 10 and 10'.

FIG. 2 is a cross-sectional view of the pipeline of FIG. 1, taken in direction 2—2. Reference numeral 18' therein indicates the bore of the pipe section 10'. Reference numerals 20' indicate the bolt holes for receiving bolts 15. As illustrated by FIG. 2, the flared liner portion 14' does not extend to the circumferential edge 21' of anterior flange face 13'. Conductor 17 has dimensions such that, when inserted into the flange gap, it does not establish contact with flared liner portion 14'. This ensures that the insertion of conductor 17 between anterior flange faces 13 and 13' will not disrupt the polymeric liner.

FIGS. 3, 4, 5, and 6 illustrate exemplary conductors of the subject invention. In particular, FIG. 3 is a greatly enlarged isometric view of a conductor 22 comprising a substantially V-shaped strip of metal. Conductor 22 comprises arm portions 23 and 24. Arm portions 23 and 24 have ends 26 and 28, respectively. Arm portions 23 and 24 serve to define a substantially V-shaped conductor gap 29. Conductor gap 29 has a length 30, defined as the distance between ends 26 and 28 across conductor gap 29, measured prior to the insertion of conductor 22 between the opposing anterior flange faces.

FIG. 4 is a greatly enlarged isometric view of a substantially V-shaped conductor 31 of the subject invention. Conductor 31 comprises arm portions 32 and 34. Arm portions 32 and 34 have ends 36 and 38, respectively. Arm portions 32 and 34 serve to define a substantially V-shaped conductor gap 40. Conductor gap 40 has a length 42, defined as the distance between ends 36 and 38 across conductor gap 40, measured before conductor 31 is inserted between the opposing anterior flange faces. Formed within arm portions 32 and 34 are barbs 44 which extend outwardly from the surfaces thereof. Barbs 44 will preferably serve to penetrate any insulating coating, e.g., paint disposed upon the anterior flange faces, during the insertion of conductor 31 therebetween. Barbs 44 will preferably further serve to facilitate the retention of conductor 31 between the anterior flange faces. Tab portions 46 and 48 extend outwardly from ends 36 and 38, respectively. Tab portions 46 and 48 will preferably serve to control the depth of insertion of conductor 31 within the gap between the anterior flange faces. Tab portions 46 and 48 will preferably further permit the facile identification of each conductor 31 retained between the anterior flange faces.

FIG. 5 is a greatly enlarged isometric view of a substantially U-shaped conductor 49 of the subject invention. Conductor 49 comprises arm portions 50 and 51. Arm portions 50 and 51 have ends 52 and 54, respectively. Arm portions 50 and 51 serve to define a substantially U-shaped conductor gap 56 disposed therebetween. Conductor gap 56 has a length 58, defined as the distance between ends 52 and 54 across conductor gap 56, measured prior to the insertion of conductor 49 between the opposing anterior flange faces. Formed within arm portions 50 and 51 are barbs 60. Barbs 60 serve substantially the same function as set forth with respect to barbs 44 of conductor 31 of FIG. 4. Tab portions 62 and 64 extend outwardly from ends 52 and 54, respectively. Tab portions 62 and 64 serve essentially the same function as tab portions 46 and 48, respectively, of FIG 4.

FIG. 6 is a greatly enlarged isometric view of a substantially W-shaped conductor 65 of the subject invention. Conductor 65 comprises outer arm portions 66 and 68 and compressive arm portions 70 and 72 which collectively serve to define a substantially W-shaped conductor gap 74. Outer arm portions 66 and 68 have ends 76 and 78, respectively. Conductor gap 74 has a length 75, defined as the distance between ends 76 and 78 across conductor gap 74, measured prior to the insertion of conductor 65 between the opposing anterior flange faces. Formed within outer arm portions 66 and 68 are barbs 80. Barbs 80 serve substantially the same function as set forth with respect to barbs 44 of FIG. 4. Tab portions 82 and 83 extend outwardly from ends 76 and 78, respectively. Tab portions 82 and 83 serve essentially the same function as tab portions 46 and 48, respectively, of FIG. 4.

Figure 8:
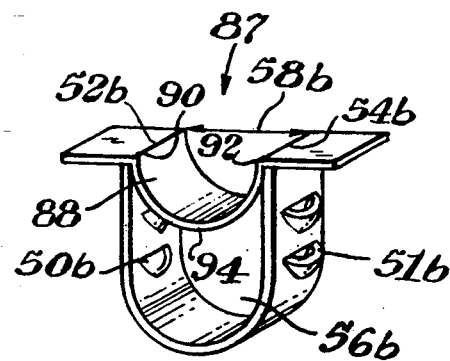
FIG. 8 is a greatly enlarged isometric view of a conductor similar to that of FIG. 5, further comprising an arcuate metallic member extending across the gap.
Figure 9:
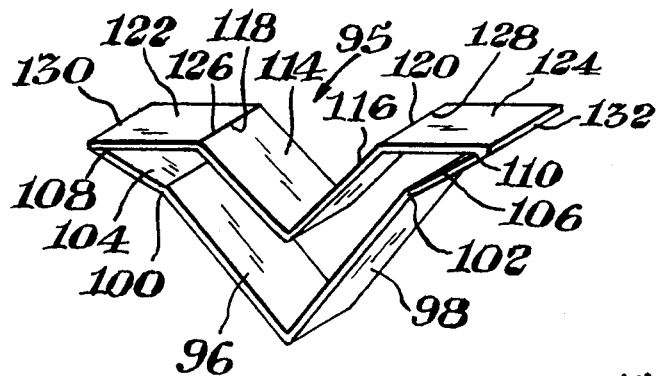
FIG. 9 is a greatly enlarged isometric view of a conductor which forms a part of another embodiment of the subject invention, provided with alternative means for pressing the conductor into electrical contact with the opposing flange ends.

To better facilitate retention of the conductor between the opposing adjacent flange ends, the conductor may be provided with means for pressing the arm portions outwardly into electrical contact with the opposing flange ends. FIGS. 7, 8, and 9 illustrate various suitable pressing means. In particular, FIG. 7 is a greatly enlarged isometric view of a substantially U-shaped conductor 84 similar to conductor 49 of FIG. 5. Conductor 84 is provided with a piece of compressible material 85 within the conductor gap 56a. Piece 85 may comprise any compressible material. For instance, piece 85 may comprise cork, rubber, or a polymeric foam, e.g., a polyurethane foam. In preferred embodiments, piece 85 will conform to the shape of conductor gap 56a.

FIG. 8 is a perspective view of a substantially U-shaped conductor 87 similar to conductor 49 of FIG. 5. Conductor 87 is provided with a compressible metallic strip member 88 for pressing the arm portions 50b and 51b outwardly into contact with the opposing flanged ends. The compressible metallic strip member 88 has two ends 90 and 92, respectively. The compressible metallic strip member 88 has a longitudinal length 94 defined as the longitudinal distance between ends 90 and 92 along compressible strip member 88. To facilitate the pressing of arm portions 50b and 51b into the opposing anterior flange faces, length 94 should be greater than length 58b, wherein length 58b is as defined with respect to length 58 of FIG. 5. Compressible metallic strip member 88 will preferably be joined to end 52b of arm portion 50b at end 90 and to end 54b of arm portion 51b at end 92. In the alternative, compressible metallic strip member 88 may be held within conductor gap 56b upon insertion of conductor 87 between the anterior flange faces, merely by the compressive force exerted thereupon.

FIG. 9 is a greatly enlarged isometric view of a substantially V-shaped conductor 95 provided with means for pressing the conductor into contact with the opposing anterior flange faces. Conductor 95 comprises arm portions 96 and 98, having ends 100 and 102, respectively. Tab portions 104 and 106 extend outwardly from ends 100 and 102, respectively. Tab portions 104 and 106 have ends 108 and 110, respectively. To facilitate compression, conductor 95 further comprises second arm portions 114 and 116, respectively. Second arm portions 114 and 116 have ends 118 and 120, respectively. Second tab portions 122 and 124 extend outwardly from ends 118 and 120, respectively. Second tab portions 122 and 124 have first ends 126 and 128, respectively. First end 126 is joined to end 118 by suitable fastening means. Likewise, first end 128 is joined to end 120 by suitable fastening means. Second tab portions 122 and 124 have second ends 130 and 132. Second end 130 is joined to end 108 by suitable fastening means. Likewise, second end 132 is joined to end 110 by suitable fastening means. Suitable fastening means may comprise, e.g., welding, brazing, riveting or crimping. In the alternative, conductor 95 may be formed of an integral ring of metal bent or stamped into the illustrated configuration.

Figure 10:
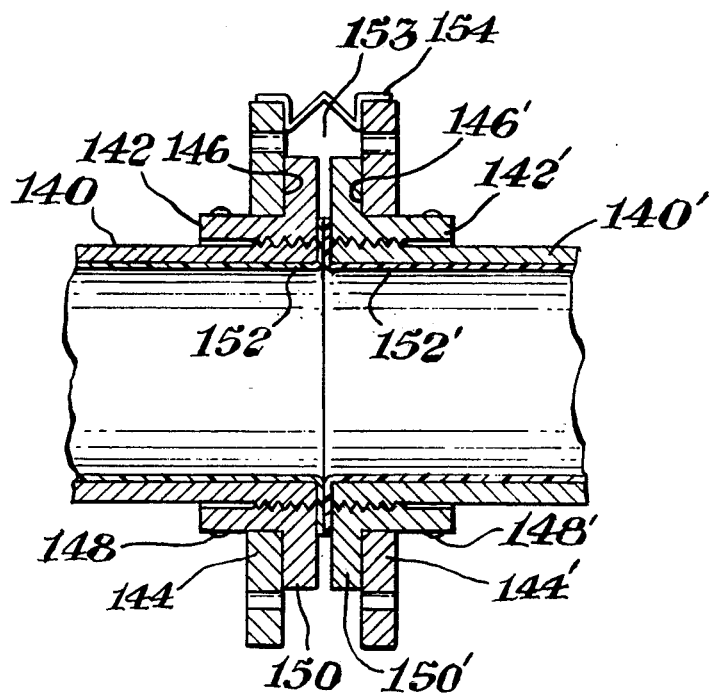
FIG. 10 is a fragmentary side sectional view of two sections of pipe with a flange connection of the subject invention illustrated therewith.

FIG. 10 is a fragmentary side sectional view of two sections of pipe shown with a pipe flange connection utilizing the rotatable flange described in copending U.S. patent application Ser. No. 498,166, now abandoned herein incorporated by reference. This connection is particularly adapted to receive conductors such as those described in FIGS. 6, 7, 8, and 9. For the purpose of illustration, a W-shaped conductor has been depicted.

Shown in FIG. 10 are portions of two adjacent pipe segments 140 and 140', respectively. Pipe segments 140 and 140' end respectively at flared stub end collars 142 and 142', flared stub end collars 142 and 142' being internally threaded to engage threads on the outside surface of pipe segments 140 and 140', respectively. Flanges 144 and 144', having anterior flange faces 146 and 146', are provided on flared stub end collars 142 and 142', respectively. Weld beads 148 and 148' are provided on flared stub end collars 142 and 142', respectively, for the purpose of retaining flanges 144 and 144' respectively, in close proximity to the flared ends 150 and 150', respectively, of flared stub end collars 142 and 142', respectively. The polymeric liners 152 and 152', inserted within the bores of pipe segments 140 and 140', respectively, are flared to engage the flared ends 150 and 150'. Joinder of pipe segments 140 and 141' by suitable fastening means, e.g., by bolting in a manner known in the art, but not illustrated for the purpose of clarity, creates a flange gap 153. Conductor 154 is retained within flange gap 153 to promote electrical conductivity between pipe segments 140 and 140'.

The conductors of the subject invention may be fabricated of any material which is both conductive to electricity and durable. Preferred materials include carbon steel, galvanized steel, nickel plated steel, stainless steel, and brass. The selected material should be resilient enough to facilitate the retention of the conductors between the opposing anterior flange faces. Preferably, the conductor will be fabricated of spring steel or a heat-treated cold rolled steel. The compressible metallic strip member may be fabricated of a material similar to that selected for the conductor. The compressible metallic strip member should be of a composition and a thickness suitable to resiliently press the arm portions of the conductor into contact with the opposing anterior flange faces.

The barbs provided within the arm portions of the conductor may be of any size and configuration suitable to establish electrical contact with the anterior flange faces and to facilitate the retention of the conductor between such flange faces. Suitable barbs may thus comprise a plurality of sharp points or larger sharp edges. In a preferred embodiment, the barbs will be either linear or arcuate in shape. Such larger dimension barbs will provide a greater surface area at the point of electrical contact. Such a relatively large surface area translates to a more efficient transfer of electrical current from one anterior flange face to another.

The subject invention enjoys utility in pipe flange connections wherein the gap between opposing anterior flange faces is up to one inch or more in length. Such larger flange gaps may result when the flange is positioned at some point removed from the end of the pipe segment, e.g., as illustrated in FIG. 10. In such larger gap embodiments, it will be preferred to employ a substantially U-shaped or W-shaped conductor as described above. If a U-shaped conductor is selected, the conductor will more preferably be provided with means for pressing the arm portions of the conductor outwardly into contact with the opposing anterior flange faces.

The practitioner may provide one or more conductors between a pair of opposing anterior flange faces. The practitioner should provide a sufficient number of conductors to enable the efficient transfer of electrical current between adjacent pipe sections. Preferably, two to four conductors will be provided between a given pair of opposing anterior flange faces.

The subject invention has been described with respect to lined pipe, the flared polymeric liner interrupting the electrical conductivity between adjacent pipe sections. This invention further applies to unlined pipe connections, wherein other nonconductive means, e.g. a gasket, are provided between adjacent pipe ends.

The subject invention, as illustrated, shows the metal conductor proximate to a connecting bolt; see, e.g., FIGS. 1 and 10. In fact, the metal conductor need not be positioned proximate to a bolt. Indeed, it may be preferred to position the conductor such that it is not proximate to a bolt, e.g., to permit a greater depth of insertion and a correspondingly greater surface of electrical contact.

The above detailed description has been provided for the purposes of illustration rather than limitation. The scope of the invention is to be limited only by the following claims.

We claim:

1. A metal conductor element suitable for insertion between adjacent metal faces comprising a bent metal strip in part defined by first and second arm portions with corresponding first and second arm ends, the arms disposed such that the conductor is substantially U-shaped, V-shaped, or W-shaped, the arm portions defining a corresponding U-shaped, V-shaped, or W-shaped gap therebetween, the first and second arm portions bearing barbs.

2. The conductor element of claim 1, further comprising first and second outwardly extending tab portions attached to the first and second arm ends, respectively.

3. The conductor element of claim 1, further comprising means for pressing the first and second arm portions into electrical contact with the adjacent metal faces.

4. The conductor element of claim 3, wherein the means for pressing the first and second arm portions comprise a piece of compressible material adapted for receipt within a gap defined by the first and second arm portions.

5. The conductor element of claim 3, wherein the means for pressing the first and second arm portions comprise a compressible metal strip member having first and second member ends and a longitudinal length defined as the distance between the first and second member ends, the first and second member ends being fastened to the first and second arm portions, respectively, the longitudinal length of the member being greater than the length of the gap, the length of the gap being defined as the distance between the first and second arm ends measured before the conductor is inserted between adjacent metal faces.

* * * * *